(12) United States Patent
Kim et al.

(10) Patent No.: US 7,368,496 B2
(45) Date of Patent: *May 6, 2008

(54) NANOCOMPOSITE COMPOSITION HAVING SUPER BARRIER PROPERTY AND ARTICLE USING THE SAME

(75) Inventors: Myung-Ho Kim, Daejeon (KR);
Shi-Ho Lee, Daejeon (KR);
Young-Chul Yang, Seoul (KR);
Ku-Min Yang, Seoul (KR)

(73) Assignee: LG Chem, Ltd. (KR)

( * ) Notice: Subject to any disclaimer, the term of this patent is extended or adjusted under 35 U.S.C. 154(b) by 444 days.

This patent is subject to a terminal disclaimer.

(21) Appl. No.: 11/080,747

(22) Filed: Mar. 15, 2005

(65) Prior Publication Data

US 2005/0215694 A1     Sep. 29, 2005

Related U.S. Application Data

(63) Continuation-in-part of application No. 10/469,270, filed as application No. PCT/KR02/02339 on Dec. 11, 2002, now Pat. No. 7,138,452.

(30) Foreign Application Priority Data

Dec. 27, 2001  (KR)  ............... 2001-0086319
Dec. 4, 2002   (KR)  ............... 2002-0076572

(51) Int. Cl.
   *C08K 3/34*     (2006.01)
(52) U.S. Cl. ............. 524/445; 524/447; 524/449; 524/451; 523/205; 523/206; 523/209; 523/216
(58) Field of Classification Search ............... 523/205, 523/206, 209, 216; 524/445–451
See application file for complete search history.

(56) References Cited

U.S. PATENT DOCUMENTS

| | | | |
|---|---|---|---|
| 4,618,528 A | 10/1986 | Sacks et al. ............... 428/216 |
| 4,739,007 A | 4/1988 | Okada et al. ............... 524/789 |
| 4,810,734 A | 3/1989 | Kawasumi et al. ......... 523/216 |
| 4,874,728 A | 10/1989 | Eilliott et al. ............... 501/148 |
| 4,889,885 A | 12/1989 | Usuki et al. ................ 524/445 |
| 4,971,864 A | 11/1990 | McCord ..................... 428/516 |
| 5,356,990 A | 10/1994 | Pucci .......................... 525/57 |
| 5,385,776 A | 1/1995 | Maxfield et al. ............ 428/297 |
| 6,414,070 B1 | 7/2002 | Kausch et al. .............. 524/445 |
| 6,552,113 B2 * | 4/2003 | Bagrodia et al. ........... 524/445 |
| 6,770,697 B2 * | 8/2004 | Drewniak et al. .......... 524/445 |
| 2004/0106719 A1 | 6/2004 | Kim et al. ................... 524/445 |

FOREIGN PATENT DOCUMENTS

| | | |
|---|---|---|
| EP | 0 015 556 | 9/1980 |
| EP | 0 210 725 A1 | 2/1987 |
| EP | 1 460 109 A1 | 9/2004 |
| WO | WO 2004/005388 A1 | 1/2004 |
| WO | WO 2004/085534 A1 | 10/2004 |

OTHER PUBLICATIONS

PCT International Search Repor t for International Application No. PCT/KR2005/002147; Date of Mailing International Search Report Dec. 16, 2005.

* cited by examiner

*Primary Examiner*—Peter Szekely
(74) *Attorney, Agent, or Firm*—Cantor Colburn LLP

(57) ABSTRACT

A nanocomposite composition having superior barrier properties and an article comprising the same are provided. The nanocomposite composition includes: a polyolefin resin; a nanocomposite having barrier properties, and including intercalated clay and one or more resins having barrier properties, and a compatibilizer. The resin having barrier properties comprises an ethylene-vinyl alcohol copolymer, a polyamide, an ionomer, a polyvinyl alcohol, or a combination comprising one or more of the foregoing resins. The nanocomposite composition has superior mechanical strength and can form a strong barrier to oxygen, organic solvent, and moisture. Also, the nanocomposite composition has superior chemical barrier properties and can be used in single/multi-layer blow molding and film processing.

19 Claims, 3 Drawing Sheets

NANOCOMPOSITE COMPOSITION HAVING SUPER BARRIER PROPERTY AND ARTICLE USING THE SAME

CROSS-REFERENCE TO RELATED APPLICATION

This is a continuation-in-part application of U.S. patent application Ser. No. 10/469,270, filed Aug. 27, 2003, now U.S. Pat. No. 7,138,452, in the U.S. Patent and Trademark Office, the disclosure of which is incorporated herein in its entirety by reference, which was the National Stage of International Application No. PCT/KR02/02339, filed Dec. 11, 2002, and which claimed the benefit of the dates of the earlier filed Korean Patent Application Nos. 2001-0086319 filed Dec. 27, 2001 and 2002-0076572 filed Dec. 4, 2002.

BACKGROUND OF THE INVENTION

1. Field of the Invention

The present invention relates to a nanocomposite composition having superior barrier properties and an article comprising the same, and more particularly to a nanocomposite composition having superior mechanical strength and superior oxygen, organic solvent, and moisture barrier properties, which can be used in single/multi-layer blow molding and film processing, and an article using the same.

2. Description of the Related Art

General-purpose resins, such as polyethylene and polypropylene, are used in many fields due to their superior moldability, mechanical properties, and moisture barrier properties. While these resins have good gas barrier properties as well, they are limited in their use in packaging or containers for agrochemicals and foods, which require superior chemical and oxygen barrier properties. Therefore, packaging or containers (e.g., bottles) for such materials are manufactured with multi-layers by co-extrusion, lamination, coating, etc.

Multi-layer plastic products composed of an ethylene-vinyl alcohol (EVOH) copolymer and polyamide are transparent and have good gas barrier properties. However, because ethylene-vinyl alcohol copolymer and polyamide resins are more expensive than general-purpose resins, the amount of these resins used is limited, and the ethylene-vinyl alcohol and polyamide resins should be formed as thin as possible.

To reduce the production costs of multi-layer plastic containers, a method of compounding ethylene-vinyl alcohol and polyamide resins with a more inexpensive polyolefin has been proposed. However, because ethylene-vinyl alcohol and polyamide are not very compatible with polyolefin, the blending is not easy. If ethylene-vinyl alcohol and polyamide are blended insufficiently, the mechanical properties of produced films or sheets become poor.

Thus, a method of using a compatibilizer to increase the compatibility of ethylene-vinyl alcohol and polyamide resin with polyolefin has been proposed. Because the compatibilizer increases compatibility of ethylene-vinyl alcohol and polyamide resin with polyolefin, which is necessary to provide a product with good mechanical strength and chemical barrier properties.

U.S. Pat. No. 4,971,864, U.S. Pat. No. 5,356,990, EP No. 15,556, and EP No. 210,725 disclose methods of using a compatibilizer prepared by grafting polyethylene with maleic anhydride. While this compatibilizer improves oxygen barrier properties and mechanical strength, moisture barrier properties are poor due to the hydrophilic properties of ethylene-vinyl alcohol, polyamide resin and ionomers. Therefore, hydrophobic resin processing at the outermost layer is necessary, and there is no suitable processing condition for obtaining an effective barrier property morphology.

As disclosed in U.S. Pat. Nos. 4,739,007, 4,618,528, 4,874,728, 4,889,885, 4,810,734, and 5,385,776, a nanocomposite contains exfoliated or intercalated platelets, tactoidal structures, or a dispersion mixture thereof, the particles having nanometer dimensions, and intercalated clay dispersed in a matrix polymer, such as an oligomer, a polymer, or a blend thereof.

In general, the manufacturing of nanocomposites is divided into two methods.

The first method is the manufacturing method of the above-described polyamide nanocomposite. In this method, monomers are inserted into intercalated organic clay, and the clay platelets are dispersed through inter-layer polymerization. This method is restricted in that it is applicable only when cationic polymerization is possible.

The other method is a melt compounding method in which melted polymer chains are inserted into intercalated clay and exfoliated through mechanical compounding. Examples of such a method are disclosed in "Preparation of polystyrene nanocomposite" (R. A. Vaia, et. al, Chem. Mater., 5, 1694(1993)), "Preparation of polypropylene nanocomposite" (M. Kawasumi, et. al, Macromolecules, 30, 6333(1997)), and "Preparation of nylon 6 nanocomposite" (U.S. Pat. No. 5,385,776), etc.

Therefore, a nanocomposite having superior mechanical strength and chemical barrier properties that is capable of realizing effective barrier property morphology is needed.

SUMMARY OF THE INVENTION

The present invention provides a nanocomposite composition having superior mechanical strength and superior oxygen, organic solvent, and moisture barrier properties, which can be used in single/multi-layer blow molding and film processing.

The present invention also provides a container and a film prepared from said nanocomposite composition.

According to an aspect of the present invention, there is provided a nanocomposite composition including: 1 to 97 wt % of a polyolefin resin; 1 to 95 wt % of a nanocomposite having barrier properties, comprising a resin having barrier properties and an intercalated clay at a weight ratio of 58.0:42.0 to 99.9:0.1, wherein the resin having barrier properties comprises an ethylene-vinyl alcohol copolymer, apolyamide, an ionomer, a polyvinyl alcohol, or a combination comprising one or more of the foregoing resins; and c) 1 to 95 wt % of a compatibilizer.

According to another aspect of the present invention, there is provided a container and a film prepared from said nanocomposite composition.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
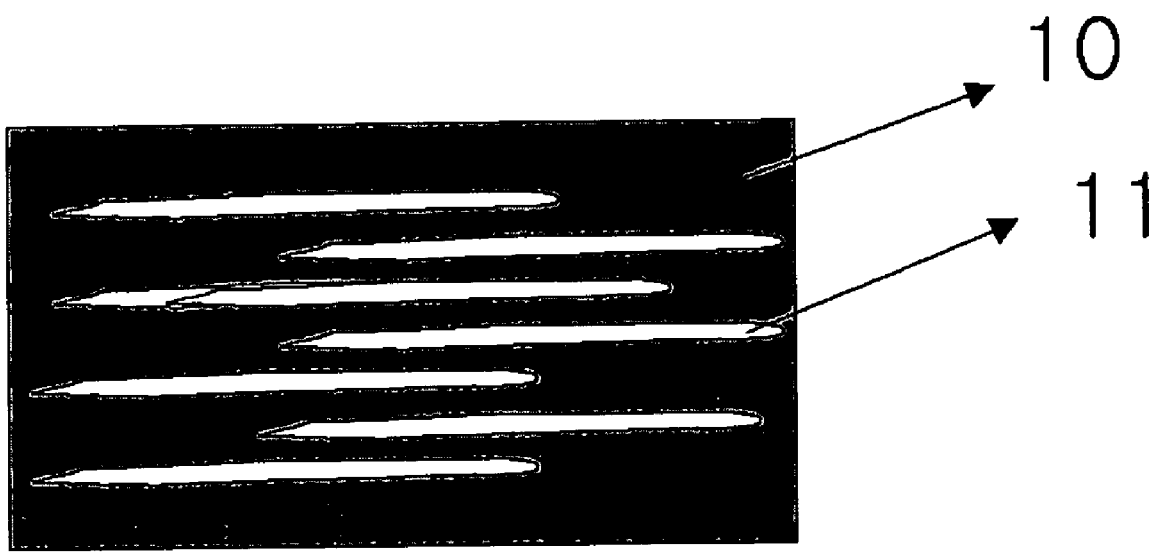
FIG. 1 is a schematic diagram of the morphology of a nanocomposite having barrier properties dispersed in a continuous polyolefin phase in a molded article prepared from a nanocomposite composition according to an embodiment of the present invention.

The present invention will now be explained in more detail.

The inventors of the present invention worked to develop a method of improving the mechanical strength and chemical barrier properties of a nanocomposite composition. In doing so, we found that a nanocomposite prepared by exfoliating intercalated clay in a resin having barrier properties, such as ethylene-vinyl alcohol (EVOH) copolymer, a polyamide, an ionomer, and polyvinyl alcohol (PVA), forms a strong barrier to moisture and liquid by extending a gas and liquid passage inside the resin, and suppresses parison sagging during blow molding by increasing melt strength of the continuous polyolefin phase. Also, we found that a nanocomposite composition comprising such a nanocomposite, a polyolefin resin and a compatibilizer has superior mechanical strength and forms a strong barrier to oxygen, organic solvents, and moisture.

According to an embodiment of the present invention, a nanocomposite composition comprises a polyolefin resin; a nanocomposite having barrier properties, and comprising an intercalated clay and one or more resins having barrier properties selected from the group consisting of an ethylene-vinyl alcohol (EVOH) copolymer, a polyamide, an ionomer, and a polyvinyl alcohol (PVA); and a compatibilizer.

The polyolefin resin may include, for example, a high density polyethylene (HDPE), a low density polyethylene (LDPE), a linear low density polyethylene (LLDPE), an ethylene-propylene copolymer, metallocene polyethylene, polypropylene, or a combination comprising one or more of the foregoing polyolefin resins. The polypropylene may comprise a homopolymer of propylene, a copolymer of propylene, metallocene polypropylene, a composite resin having improved physical properties by adding talc, flame retardant, etc. to a homopolymer or copolymer of propylene, or a combination comprising one or more of the foregoing polypropylene resins.

The content of the polyolefin resin in the nanocomposite composition is preferably 1 to 97 wt %, and more preferably 20 to 97 wt % of the total weight of the nanocomposite composition. If the content of the polyolefin resin is less than 1 wt %, molding may be difficult. If the content of the polyolefin resin is greater than 97 wt %, the barrier properties may be poor.

The weight ratio of the resin having barrier properties to the intercalated clay in the nanocomposite is 58.0:42.0 to 99.9:0.1, and preferably 85.0:15.0 to 99.0:1.0. If the weight ratio of the resin having barrier properties to the intercalated clay is less than 58.0:42.0, the intercalated clay agglomerates and dispersing may be difficult. If the weight ratio of the resin having barrier properties to the intercalated clay is greater than 99.9:0.1, the improvement in the barrier properties may be negligible.

The intercalated clay is preferably organic intercalated clay. The content of organic material in the intercalated clay is preferably 1 to 45 wt %.

The intercalated clay comprises montmorillonite, bentonite, kaolinite, mica, hectorite, fluorohectorite, saponite, beidelite, nontronite, stevensite, vermiculite, hallosite, volkonskoite, suconite, magadite, kenyalite, or a combination comprising one or more of the foregoing materials; and the organic material preferably has a functional group selected from primary ammonium, secondary ammonium, tertiary ammonium, quaternary ammonium, phosphonium, maleate, succinate, acrylate, benzylic hydrogen, oxazoline, and dimethyldistearylammonium, or a combination comprising one or more of the foregoing groups.

If ethylene-vinyl alcohol copolymer is included in the nanocomposite, the concentration of ethylene in the ethylene-vinyl alcohol copolymer is preferably 10 to 50 mol %. If the content of ethylene is less than 10 mol %, melt molding may become difficult due to poor processability. If the content of ethylene exceeds 50 mol %, the composite may not properly function as barrier to oxygen and liquid.

If polyamide is included in the nanocomposite, the polyamide may be nylon 4.6, nylon 6, nylon 6.6, nylon 6.10, nylon 7, nylon 8, nylon 9, nylon 11, nylon 12, nylon 46, MXD6, amorphous polyamide, a copolymerized polyamide containing at least two of these, or a mixture of at least two of these.

Amorphous polyamide refers to a polyamide having insufficient crystallinity, that is, not having an endothermic crystalline melting peak when measured by a differential scanning calorimetry (DSC) (ASTM D-3417, 10° C./min).

In general, the polyamide can be prepared using diamine and dicarboxylic acid. Examples of the diamine include hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidene, 1,4-diaminocyclohexane, 1,3-diaminocyclohexane, meta-xylenediamine, 1,5-diaminopentane, 1,4-diaminobutane, 1,3-diaminopropane, 2-ethyldiaminobutane, 1,4-diaminomethylcyclohexane, methane-xylenediamine, alkyl-substituted or unsubstituted m-phenylenediamine and p-phenylenediamine, etc. Examples of the dicarboxylic acid include alkyl-substituted or unsubstituted isophthalic acid, terephthalic acid, adipic acid, sebacic acid, butanedicarboxylic acid, etc.

Polyamides prepared using aliphatic diamines and aliphatic dicarboxylic acids are generally semicrystalline polyamides (also referred to as crystalline nylon) and are not amorphous polyamide. Polyamides prepared using aromatic diamines and aromatic dicarboxylic acids are not easily treated using a general melting process.

Thus, amorphous polyamides may be prepared, when one of the diamine and dicarboxylic acid used is aromatic, and the other is aliphatic. Aliphatic groups of the amorphous polyamide are preferably $C_1$-$C_{15}$ aliphatic or $C_4$-$C_8$ alicyclic alkyls. Aromatic groups of the amorphous polyamide are preferably substituted $C_1$-$C_6$ mono- or bicyclic aromatic groups. However, not all amorphous polyamides are preferable in the present invention. For example, metaxylenediamine adipamide is easily crystallized when heated during a thermal molding process or when oriented, and therefore, it is not preferable.

Examples of preferred amorphous polyamides include hexamethylenediamine isophthalamide, hexamethylene diamine isophthalamide/terephthalamide terpolymer having a ratio of isophthalic acid/terephthalic acid of 99/1 to 60/40; a mixture of 2,2,4- and 2,4,4-trimethylhexamethylenediamine terephthalamide; a copolymer of hexamethylenediamine or 2-methylpentamethylenediamine, an isophthalic acid or terephthalic acid, or mixtures thereof; and combinations comprising one or more of the foregoing amorphous polyamides. While polyamide based on hexamethylenediamine isophthalamide/terephthalamide, which has a high terephthalic acid content, is useful, it may be mixed with another diamine such as 2-methyldiaminopentane in order to produce an amorphous polyamide that can be processed.

The amorphous polyamide, may comprise a small amount of lactam, such as caprolactam or lauryl lactam, as a comonomer. It is preferred that the polyamide be amorphous. Therefore, a comonomer that does not crystallize polyamide can be employed. About 10 wt % or less of a liquid or solid plasticizer, such as glycerol, sorbitol, or toluenesulfoneamide (Santicizer 8 monsanto) can also be included in the amorphous polyamide. For most applications, a glass transition temperature Tg (measured in a dried state, i.e., with a water content of about 0.12 wt % or less) of amorphous polyamide is about 70-170° C., and preferably about 80-160° C. The amorphous polyamide, which is not blended, has a Tg of approximately 125° C. in a dried state. The lower limit of Tg is not clear, but 70° C. is an approximate lower limit. The upper limit of Tg is also not clear. However, when a polyamide with a Tg of about 170° C. or greater is used, thermal molding may be difficult. Therefore, polyamide having both an acid and an amine having aromatic groups cannot be thermally molded due to too high Tg, and thus, is not suitable for the purposes of the present invention.

The polyamide may also comprise a semicrystalline polyamide. The semicrystalline polyamide is generally prepared using lactam, such as nylon 6 or nylon 11, or an amino acid, or is prepared by condensing diamine, such as hexamethylenediamine, with dibasic acid, such as succinic acid, adipic acid, or sebacic acid. The polyamide may be a copolymer or a terpolymer such as a copolymer of hexamethylenediamine/adipic acid and caprolactame (nylon 6, 66). A mixture of two or more crystalline polyamides can also be used. The semicrystalline and amorphous polyamides are prepared by condensation polymerization well-known in the art.

If the nanocomposite is an ionomer, the ionomer is preferably a copolymer of acrylic acid and ethylene, with a melt index of 0.1 to 10 g/10 min (190° C., 2,160 g).

The content of the nanocomposite having barrier properties in the nanocomposite composition is preferably 1 to 95 wt %, and more preferably 1 to 30 wt % of the total weight of the nanocomposite composition. If the content of the nanocomposite is less than 1 wt %, an improvement of barrier properties of the nanocomposite composition may be negligible. If the content of the nanocomposite is greater than 95 wt %, processing may be difficult.

The nanocomposite having barrier properties offers favorable conditions to realize the morphology illustrated in FIG. 1, according to the concentration of the intercalated clay. The finer the intercalated clay is exfoliated in the discontinuous resin (ethylene-vinyl alcohol, polyamide, ionomer, or polyvinyl alcohol), the better the barrier properties that can be obtained. This is because the exfoliated intercalated clay forms a barrier film and thereby improves barrier properties and mechanical properties of the resin itself, and ultimately improves barrier properties and mechanical properties of a molded article prepared from the composition.

Accordingly, the ability to form a barrier to gas and liquid is maximized by compounding the resin having barrier properties and the intercalated clay, and dispersing the nano-sized intercalated clay in the resin, thereby maximizing the contact area of the polymer chain and the intercalated clay.

The compatibilizer in the nanocomposite composition reduces brittleness of the polyolefin resin and improves the compatibility of the polyolefin resin in the nanocomposite to form a composition with a stable structure.

The compatibilizer may be a hydrocarbon polymer having polar groups. When a hydrocarbon polymer having polar groups is used, the hydrocarbon polymer portion increases the affinity of the compatibilizer for the polyolefin resin and to the nanocomposite having barrier properties, thereby providing a stable structure to the nanocomposite composition.

The compatibilizer can comprise an epoxy-modified polystyrene copolymer, an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) polypropylene, a maleic anhydride modified (graft) linear low-density polyethylene, an ethylene-alkyl (meth)acrylate-(meth)actylic acid copolymer, an ethylene-butyl acrylate copolymer, an ethylene-vinyl acetate copolymer, a maleic anhydride modified (graft) ethylene-vinyl acetate copolymer, and modifications thereof, and combinations comprising one or more of the foregoing compatibilizers.

The content of the compatibilizer in the nanocomposite composition is preferably 1 to 95 wt %, and more preferably 1 to 30 wt % of the total weight of the nanocomposite composition. If the content of the compatibilizer is less than 1 wt %, the mechanical properties of a molded article formed with the composition may be poor. If the content of the compatibilizer is greater than 95 wt %, the molding of the composition may be difficult.

When the compatibilizer comprises an epoxy-modified polystryne copolymer, the epoxy-modified polystyrene copolymer comprises a main chain which comprises 70 to 99 wt % of styrene and 1 to 30 wt % of an epoxy compound represented by Formula 1, and branches which comprise 1 to 80 wt % of acrylic monomers represented by Formula 2, is preferable. The content of the epoxy-modified polystyrene copolymer in the nanocomposite composition is 1 to 80 wt %.

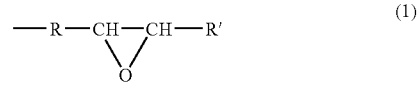

where each of R and R' is independently a $C_1$-$C_{20}$ aliphatic residue or a $C_5$-$C_{20}$ aromatic residue having double bonds at its termini

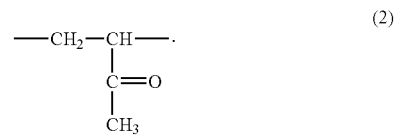

Each of the maleic anhydride modified (graft) high-density polyethylene, maleic anhydride modified (graft) linear low-density polyethylene, and maleic anhydride modified (graft) ethylene-vinyl acetate copolymer preferably comprises branches having 0.1 to 10 parts by weight of maleic anhydride based on 100 parts by weight of the main chain.

The nanocomposite composition of the present invention can be applied to blow-molded, single-layered products, and multi-layered products. The nanocomposite composition can also be used to form articles such as containers (bottles) and films by blow molding, extrusion molding, injection molding, or thermoforming.

The manufacturing methods using the nanocomposite composition are as follows.

Manufacturing by Single Process

In blow molding and injection molding for producing final products, the nanocomposite having barrier properties may be dispersed in a matrix resin (the polyolefin resin) using a single screw extruder, a co-rotation twin screw extruder, a counter-rotation twin screw extruder, a continuous compounder, a planetary gear extruder, etc.

Manufacturing by Multiple Processes

The nanocomposite having barrier properties may be prepared using a polymer compounder such as a single screw extruder, a co-rotation twin screw extruder, a counter-rotation twin screw extruder, a continuous compounder, a planetary gear compounder, a batch compounder, etc. Then, the nanocomposite is mixed with a matrix resin (the polyolefin resin) in a constant ratio to obtain the final product.

The manufacturing method may include blow molding, extrusion molding, injection molding, and thermoforming. However, the present invention is not limited to said methods, and includes all processing methods for manufacturing containers having barrier properties.

Hereinafter, the present invention is described in more detail through examples. The following examples are meant only to increase understanding of the present invention, and are not meant to limit the scope of the invention.

EXAMPLE 1

Preparation of Resin Having Barrier Properties/Intercalated Clay Nanocomposite 15 wt % of an ethylene-vinyl alcohol copolymer (EVOH; E-105B (ethylene content: 44 mol %); Kuraray, Japan; melt index: 5.5 g/10 min; density: 1.14 g/cm$^3$) and 13.3 wt % of maleic anhydride modified (graft) high-density polyethylene (HDPE-g-MAH; Uniroyal Chemical, USA; PB3009 (MAH content: 1%); melt index: 5 g/10 min; density: 0.95 g/cm$^3$) as a compatibilizer were put in the main hopper of a twin screw extruder (ZSK 25; W&P, USA). Then, 3.3 wt % of organic montmorillonite (Southern Intercalated Clay Products, USA; C2OA) as an intercalated clay was separately put in the side feeder of the twin screw extruder to prepare an ethylene-vinyl alcohol/intercalated clay nanocomposite. The extrusion temperature condition was 180-190-200-200-200-200-200° C., the screws were rotated at 300 rpm, and the discharge condition was 10 kg/hr.

Preparation of Nanocomposite Composition

The prepared ethylene-vinyl alcohol/intercalated clay nanocomposite was dry-blended with 68.4 wt % of high-density polyethylene (BD0390; LG Chem; melt index: 0.3 g/10 min; density: 0.949 g/cm$^3$) and put in the main hopper of the twin screw extruder. The mixture was extruded to obtain a nanocomposite composition. The extrusion temperature condition was 180-190-190-190-190-190-190° C., the screws were rotated at 300 rpm, and the discharge condition was 10 kg/hr.

Manufacturing of Container

The prepared nanocomposite composition was blow-molded to manufacture a 1000 mL container. The processing temperature condition was 160-190-190-190-185° C., and the screws were rotated at 33 rpm.

EXAMPLE 2

Preparation of Resin Having Barrier Properties/Intercalated Clay Nanocomposite 15 wt % of ethylene-vinyl alcohol copolymer and 13.3 wt % of maleic anhydride modified (graft) high-density polyethylene as a compatibilizer were put in the main hopper of a twin screw extruder. Then, 3.3 wt % of organic montmorillonite as an intercalated clay was separately put in the side feeder of the twin screw extruder to prepare an ethylene-vinyl alcohol/intercalated clay nanocomposite. The extrusion temperature condition was 180-190-200-200-200-200-200° C., the screws were rotated at 300 rpm, and the discharge condition was 10 kg/hr.

(Preparation of Nanocomposite Composition and Container)

The prepared ethylene-vinyl alcohol/intercalated clay nanocomposite was dry-blended with 68.4 wt % of high-density polyethylene and blow-molded to manufacture a 1000 mL container. The processing temperature condition was 160-190-190-190-185° C., and the screws were rotated at 33 rpm.

EXAMPLE 3

Preparation of Resin Having Barrier Properties/Intercalated Clay Nanocomposite 97 wt % of polyamide (nylon 6) was put in the main hopper of a twin screw extruder. Then, 3 wt % of organic montmorillonite as an intercalated clay was separately put in the side feeder of the twin screw extruder to prepare a polyamide/intercalated clay nanocomposite. The extrusion temperature condition was 220-230-245-245-245-245-245° C., the screws were rotated at 300 rpm, and the discharge condition was 10 kg/hr.

Figure 2A:
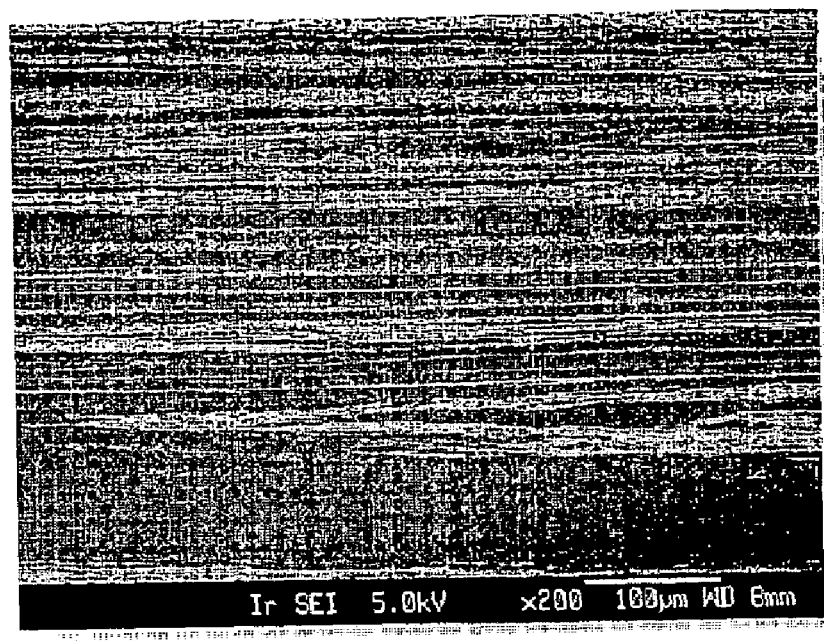
FIG. 2A is an electron microscopic photograph (×200) of a cross-section of a blow-molded container prepared according to Example 3.
Figure 2B:
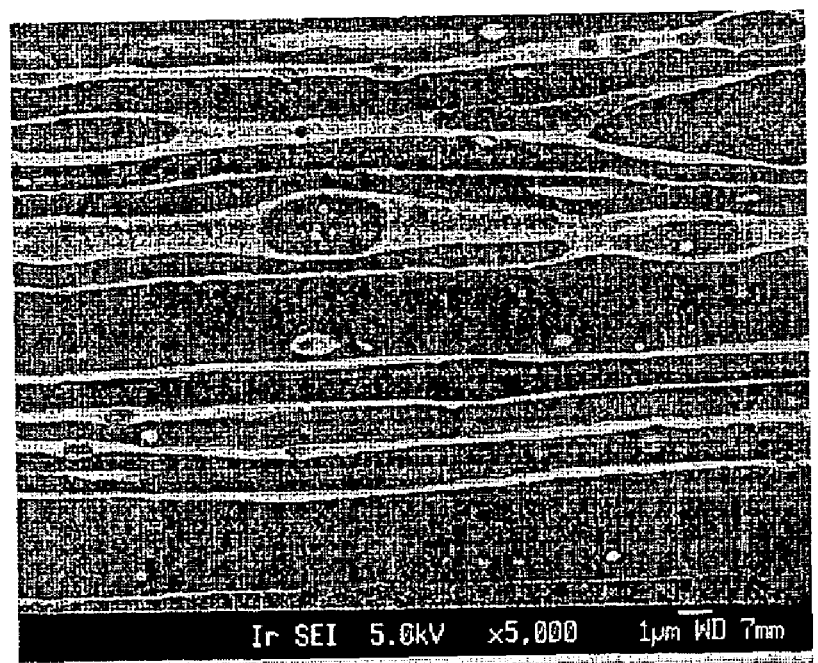
FIG. 2B is an electron microscopic photograph (×5,000) of a cross-section of a blow-molded container prepared according to Example 3.

Preparation of Nanocomposite Composition and Container 15 wt % of the prepared polyamide/intercalated clay nanocomposite was dry-blended with 7 wt % of maleic anhydride modified (graft) high-density polyethylene, as a compatibilizer, and 68 wt % of high-density polyethylene, and blow-molded to manufacture a 1000 mL container. The processing temperature condition was 160-190-190-190-185° C., and the screws were rotated at 33 rpm. A multiple lamella-patterned structure was identified when the cross-section of the blow-molded container was observed with an electron microscope (×200; ×5,000). The results are shown in FIG. 2A and FIG. 2B.

EXAMPLE 4

Preparation of Nanocomposite Having Barrier Properties 97 wt % of polyamide (nylon 6) was put in the main hopper of a twin screw extruder. Then, 3 wt % of organic montmorillonite as an intercalated clay was separately put in the side feeder of the twin screw extruder to prepare a polyamide/intercalated clay nanocomposite. The extrusion temperature condition was 220-230-245-245-245-245-245° C., the screws were rotated at 300 rpm, and the discharge condition was 10 kg/hr.

Preparation of Nanocomposite Composition and Container 15 wt % of the prepared polyamide/intercalated clay nanocomposite was dry-blended with 7 wt % of epoxy-modified polystyrene copolymer (311×121×41; Johnson Polymer, USA), as a compatibilizer, and 68 wt % of high-density polyethylene, and blow-molded to manufacture a 1000 mL container. The processing temperature condition was 160-190-190-190-185° C., and the screws were rotated at 33 rpm.

EXAMPLE 5

Preparation of Nanocomposite Having Barrier Properties 93 wt % of polyamide (nylon 6) was put in the main hopper of a twin screw extruder. Then, 7 wt % of organic montmorillonite as an intercalated clay was separately put in the side feeder of the twin screw extruder to prepare a polyamide/intercalated clay nanocomposite. The extrusion temperature condition was 220-230-245-245-245-245-245° C., the screws were rotated at 300 rpm, and the discharge condition was 10 kg/hr.

Preparation of Nanocomposite Composition and Container 15 wt % of the prepared polyamide/intercalated clay nanocomposite was dry-blended with 7 wt % of maleic anhydride-modified (graft) high-density polyethylene, as a compatibilizer, and 68 wt % of high-density polyethylene, and blow-molded to manufacture a 1000 mL container. The processing temperature condition was 190-215-215-215-195° C., and the screws were rotated at 33 rpm.

EXAMPLE 6

Preparation of Resin Having Barrier Properties/Intercalated Clay Nanocomposite 97 wt % of amorphous polyamide (SELAR 2072, DUPONT, USA) was put in the main hopper of a twin screw extruder. Then, 3 wt % of organic montmorillonite as an intercalated clay was separately put in the side feeder of the twin screw extruder to prepare a polyamide/intercalated clay nanocomposite. The extrusion temperature condition was 220-230-245-245-245-245-245° C., the screws were rotated at 300 rpm, and the discharge condition was 10 kg/hr.

Preparation of Nanocomposite Composition and Container 15 wt % of the prepared polyamide/intercalated clay nanocomposite was dry-blended with 7 wt % of maleic anhydride-modified (graft) high-density polyethylene, as a compatibilizer, and 68 wt % of high-density polyethylene, and blow-molded to manufacture a 1000 mL container. The processing temperature condition was 190-215-215-215-195° C., and the screws were rotated at 33 rpm.

COMPARATIVE EXAMPLE 1

100 wt % of high-density polyethylene was blow-molded to manufacture a 1000 mL container.

COMPARATIVE EXAMPLE 2

The same procedure of Example 1 was carried out, except that organic montmorillonite as an intercalated clay was not used.

COMPARATIVE EXAMPLE 3

The same procedure of Example 2 was carried out, except that organic montmorillonite as an intercalated clay was not used.

COMPARATIVE EXAMPLE 4

The same procedure of Example 3 was carried out, except that organic montmorillonite as an intercalated clay was not used.

COMPARATIVE EXAMPLE 5

Figure 3A:
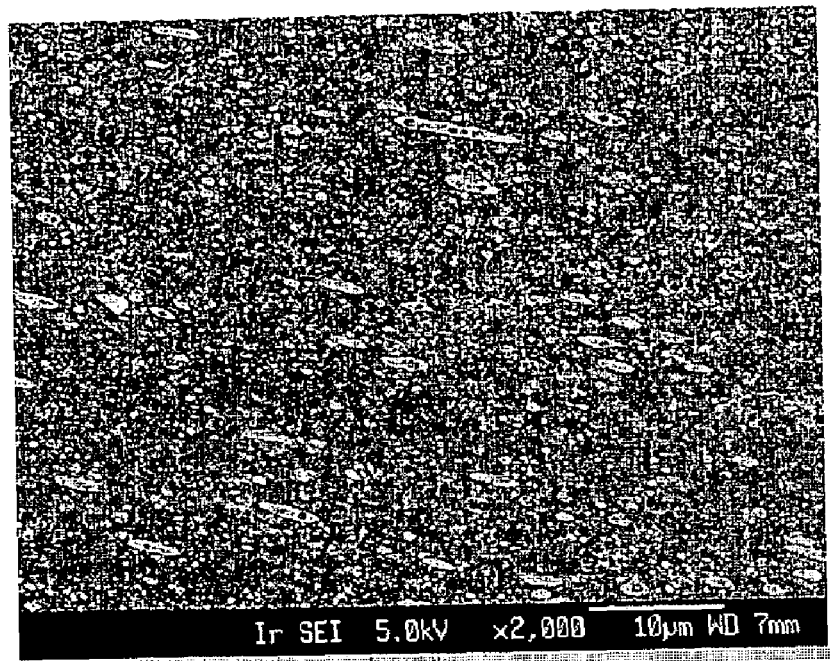
FIG. 3A is an electron microscopic photograph (×2,000) of a cross-section of a blow-molded container prepared according to Comparative Example 5.
Figure 3B:
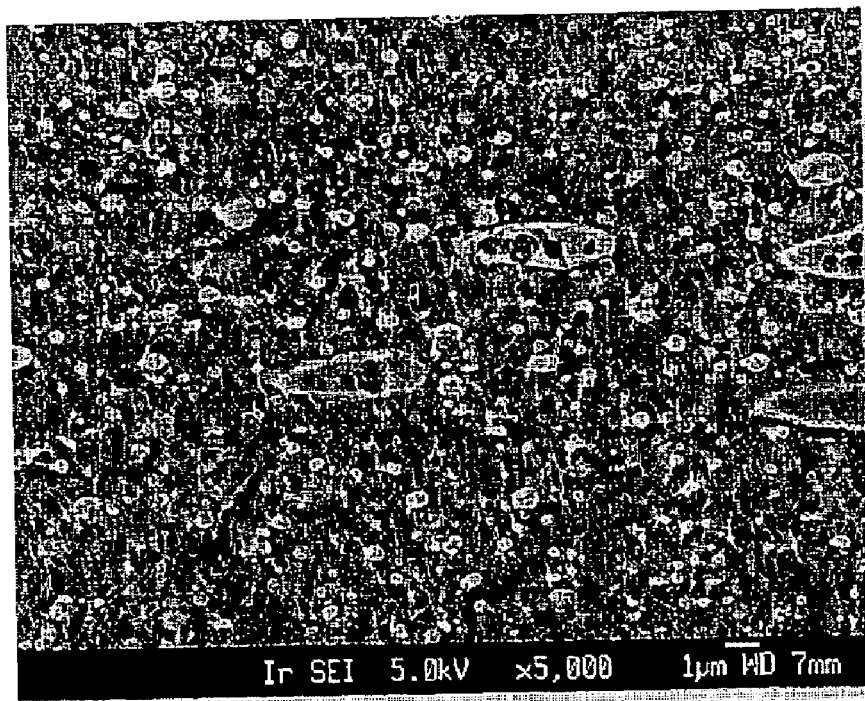
FIG. 3B is an electron microscopic photograph (×5,000) of a cross-section of a blow-molded container prepared according to Comparative Example 5.

The same procedure of Example 4 was carried out, except that organic montmorillonite as an intercalated clay was not used. The cross-section of the blow-molded container was observed with an electron microscope (×2,000; ×5,000). The results are shown in FIG. 3A and FIG. 3B.

COMPARATIVE EXAMPLE 6

Preparation of Resin Having Barrier Properties/Intercalated Clay Nanocomposite 97 wt % of high-density polyethylene was put in the main hopper of a twin screw extruder. Then, 3 wt % of organic montmorillonite as an intercalated clay was separately put in the side feeder of the twin screw extruder to prepare a high-density polyethylene/intercalated clay nanocomposite. The extrusion temperature condition was 175-190-190-190-190-190-190° C., the screws were rotated at 300 rpm, and the discharge condition was 10 kg/hr.

Preparation of Nanocomposite Composition and Container

The prepared high-density polyethylene/intercalated clay nanocomposite was blow-molded to manufacture a 1000 mL container. The processing temperature condition was 160-190-190-190-185° C., and the screws were rotated at 33 rpm.

EXPERIMENTAL EXAMPLE

For the blow-molded containers manufactured in Examples 1 through 6 and Comparative Examples 1 through 6, their effectiveness as barriers to liquid and gas were determined by the following method. The results are shown in Table 1.

a) Liquid barrier properties—Toluene, Desys herbicide (1% of deltametrine+emulsifier, stabilizer, and solvent; Kyung Nong), Batsa insecticide (50% of BPMC+50% of emulsifier and solvent), and water were put in the containers manufactured in Examples 1 to 6 and Comparative Examples 1 to 6. Then, the weight change was determined after 30 days under a condition of forced exhaust at 50° C. For toluene, the weight change was further determined at room temperature (25° C.).

b) Gas barrier properties ($cc/m^2 \cdot day \cdot atm$)—The containers blow-molded in Examples 1 to 6 and Comparative Examples 1 to 6 were left alone under a temperature of 23° C. and a relative humidity of 50% for 1 day. Then, the gas penetration rate was determined (Mocon OX-TRAN 2/20, U.S.A).

TABLE 1

| Classification | Liquid barrier properties (%) | | | | | Gas barrier properties (cc/m² · day · atm) | |
|---|---|---|---|---|---|---|---|
| | Weight change at 25° C. | Weight change at 50° C. | | | | Oxygen penetration | $CO_2$ penetration |
| | Toluene | Toluene | Desys | Batsa | Water | | |
| Example 1 | 1.29 | 14.70 | 15.24 | 2.40 | 0.000014 | 4,105 | 10,020 |
| Example 2 | 0.03 | 0.97 | 0.50 | 0.03 | 0.000002 | 82 | 167 |
| Example 3 | 0.02 | 0.85 | 0.43 | 0.03 | 0.000010 | 454 | 426 |
| Example 4 | 0.02 | 0.88 | 0.52 | 0.04 | 0.000014 | 522 | 504 |
| Example 5 | 0.01 | 0.73 | 0.383 | 0.02 | 0.000010 | 227 | 206 |
| Example 6 | 0.02 | 0.81 | 0.392 | 0.02 | 0.000010 | 347 | 405 |
| Comparative Example 1 | 3.45 | 32.52 | 26.61 | 5.60 | 0.000039 | 12,312 | 23,097 |
| Comparative Example 2 | 1.14 | 12.88 | 13.92 | 1.64 | 0.000466 | 1,320 | 1,824 |
| Comparative Example 3 | 1.70 | 15.52 | 16.91 | 2.49 | 0.000614 | 1,892 | 2,772 |
| Comparative Example 4 | 1.37 | 13.25 | 9.36 | 2.11 | 0.000062 | 2,929 | 4,116 |
| Comparative Example 5 | 1.44 | 15.17 | 10.03 | 2.43 | 0.000089 | 3,323 | 5,287 |
| Comparative Example 6 | 2.96 | 27.45 | 21.66 | 1.43 | 0.000031 | 11,204 | 20,194 |

As shown in Table 1, molded articles prepared from nanocomposite compositions of Examples 1 to 6 according to the present invention form better barriers to liquid and gas than those of Comparative Examples 1 to 6.

As described above, the nanocomposite composition of the present invention has superior mechanical strength and can form superior barriers to oxygen, organic solvent, and moisture. Also, the nanocomposite composition has good chemical barrier properties, and can be used in single/multi-layer blow molding and film processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A nanocomposite composition comprising:
   1 to 97 wt % of a polyolefin resin;
   1 to 95 wt % of a nanocomposite comprising a resin having barrier properties and an intercalated clay, at a weight ratio of 58.0:42.0 to 99.9:0.1, wherein the resin having barrier properties comprises an ethylene-vinyl alcohol copolymer, a polyamide, an ionomer, a polyvinyl alcohol, or a combination of one or more of the foregoing resins; and
   1 to 95 wt % of a compatibilizer.

2. The nanocomposite composition of claim 1, wherein the polyolefin resin is comprises a high density polyethylene, a low density polyethylene, a linear low density polyethylene, an ethylene-propylene copolymer, a metallocene polyethylene, polypropylene, or a combination of one or more of the foregoing polyolefin resins.

3. The nanocomposite composition of claim 2, wherein the polypropylene comprises a polypropylene homopolymer, a polypropylene copolymer, a metallocene polypropylene, a composite resin prepared by adding talc or flame retardant to homopolymer or copolymer of propylene, or a combination of one or more of the foregoing polypropylenes.

4. The nanocomposite composition of claim 1, wherein the intercalated clay comprises montmorillonite, bentonite, kaolinite, mica, hectorite, fluorohectorite, saponite, beidelite, nontronite, stevensite, vermiculite, hallosite, volkonskoite, suconite, magadite, kenyalite, or a combination of one or more of the foregoing materials.

5. The nanocomposite composition of claim 1, wherein the intercalated clay comprises 1 to 45 wt % of an organic material.

6. The nanocomposite composition of claim 5, wherein the organic material has a functional group comprising primary ammonium, secondary ammonium, tertiary ammonium, quaternary ammonium, phosphonium, maleate, succinate, acrylate, benzylic hydrogen, oxazoline, dimethyldistearylammonium, or a combination of one or more of the foregoing groups.

7. The nanocomposite composition of claim 1, wherein the nanocomposite comprises an ethylene-vinyl alcohol containing 10 to 50 mol % of ethylene.

8. The nanocomposite composition of claim 1, wherein the nanocomposite comprises a polyamide, and wherein the polyamide is nylon 4.6, nylon 6, nylon 6.6, nylon 6.10, nylon 7, nylon 8, nylon 9, nylon 11, nylon 12, nylon 46, MXD6, an amorphous polyamide, a copolymerized polyamide containing two or more of the foregoing polyamides, or a combination comprising one or more of the foregoing polyamides.

9. The nanocomposite composition of claim 8, wherein the polyamide is an amorphous polyamide having a glass transition temperature of about 70 to 170° C.

10. The nanocomposite composition of claim 8, wherein nanocomposite comprises an amorphous polyamide and the amorphous polyamide is hexamethylenediamine isophthalamide; hexamethylene diamine isophthalamide/terephthalamide terpolymer having a ratio of isophthalic acid/terephthalic acid of 99/1 to 60/40; a mixture of 2,2,4- and 2,4,4-trimethylhexamethylenediamine terephthalamide; a copolymer of hexamethylenediamine or 2-methylpentamethylenediamine and isophthalic acid or terephthalic acid; or a combination comprising one or more of the foregoing amorphous polyamides.

11. The nanocomposite composition of claim 10, wherein the amorphous polyamide is hexamethylene diamine isophthalamide/terephthalamide terpolymer having a ratio of isophthalic acid to terephthalic acid of 70:30.

12. The nanocomposite composition of claim 1, wherein the nanocomposite comprises an ionomer having a melt index of 0.1 to 10 g/10 min measured at 190° C.

13. The nanocomposite composition of claim 1, wherein the compatibilizer is of an epoxy-modified polystyrene copolymer, an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) polypropylene, a maleic anhydride modified (graft) linear low-density polyethylene, an ethylene-alkyl (meth)acrylate-(meth)acrylic acid copolymer, an ethylene-butyl acrylate copolymer, an ethylene-vinyl acetate copolymer, and a maleic anhydride modified (graft) ethylene-vinyl acetate copolymer, or a combination comprising one or more of the foregoing compatibilizers.

14. The nanocomposite composition of claim 13, wherein the compatibilizer comprises 1 to 80 wt % of an epoxy-modified polystyrene copolymer is a copolymer comprising a main chain which comprises styrene and an epoxy compound, and branches which comprise acrylic monomers.

15. The nanocomposite composition of claim 14, wherein the epoxy-modified polystyrene copolymer is a copolymer comprising a main chain which comprises 70 to 99 wt % of styrene and 1 to 30 wt % of an epoxy compound represented by Formula 1, and branches which comprise 1 to 80 wt % of an acrylic monomer represented by Formula 2:

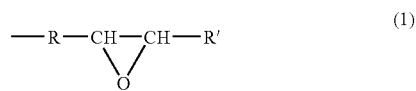

where, each of R and R' is independently a $C_1$-$C_{20}$ aliphatic residue or a $C_5$-$C_{20}$ aromatic residue having double bonds at its termini

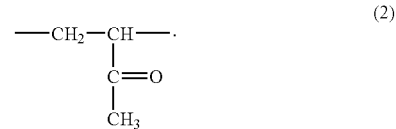

16. The nanocomposite composition of claim 13, wherein the maleic anhydride grafted high-density polyethylene, maleic anhydride grafted linear low-density polyethylene, maleic anhydride grafted polypropylene, or maleic anhydride grafted ethylene-vinyl acetate copolymer comprises branches having 0.1 to 10 parts by weight of maleic anhydride based on 100 parts by weight of the main chain.

17. An article prepared from the nanocomposite composition of claim 1.

18. The article of claim 17, comprising a container.

19. A film prepared from the nanocomposite composition of claim 1.

* * * * *